United States Patent [19]

Beaverson

[11] Patent Number: 5,339,240
[45] Date of Patent: Aug. 16, 1994

[54] SYSTEM AND METHOD FOR CONSTRUCTION OF LANGUAGE INDEPENDENT PRINT FORMAT STATEMENTS THROUGH USE OF DATA STRUCTURES FOR ARBITRARY ORDERING OF PRINT PARAMETERS

[75] Inventor: Arthur J. Beaverson, Maynard, Mass.

[73] Assignee: Digital Equipment Corporation, Maynard, Mass.

[21] Appl. No.: 724,573

[22] Filed: Jun. 28, 1991

[51] Int. Cl.⁵ .............................................. G06F 15/21
[52] U.S. Cl. .................................................. 364/419.14
[58] Field of Search ........................... 364/419, 419.14; 395/275

Primary Examiner—Gil O. Hayes
Attorney, Agent, or Firm—Denis G. Maloney; Albert P. Cefalo

[57] ABSTRACT

A system for controlling the printing of a message having a plurality of strings of text and a plurality of parameters includes means for designating the locations of the strings of text, and the locations and formats of the parameters within the message. The system also includes means for switching the locations and the formats of the parameters after they have been designated, which may include a permutation specifier.

28 Claims, 3 Drawing Sheets

Print ("On %s the population was %d,"
       date, population)

FIG. 1
(PRIOR ART)

External pop_message;
Print (pop_message, date, population)

FIG. 2
(PRIOR ART)

Pop_message = "On %s the population
               was %d"

FIG. 3
(PRIOR ART)

Pop_message = "%2.1p%d was the population on %s"

FIG. 4

Print ("In %c on %s the population was %d,"
country, date, population)

FIG. 5
*(PRIOR ART)*

External pop_message 2;
Print (pop_message2, country, date,
population)

FIG. 6
*(PRIOR ART)*

Pop_message2 = "%3.1.2p%d was the
population of %c on %s"

FIG. 7

SYSTEM AND METHOD FOR CONSTRUCTION OF LANGUAGE INDEPENDENT PRINT FORMAT STATEMENTS THROUGH USE OF DATA STRUCTURES FOR ARBITRARY ORDERING OF PRINT PARAMETERS

FIELD OF THE INVENTION

The present invention relates to a system for controlling the printing of a message. More specifically, the present invention relates to a system for controlling the printing of a message having a plurality of strings of text and a plurality of parameter values.

BACKGROUND OF THE INVENTION

A representative example of a typical print statement in a computer program is shown in FIG. 1. This print statement has a format portion, the information contained within the quotes, and a number of parameters thereafter, the "date" and "population".

The format portion is text to be printed as it appears in the print statement. In the print statement in FIG. 1, this includes "On" and "the population was." It also includes a number of format specifiers such as "%s" and "%d" which correspond to specific parameters. The first format specifier "%s" corresponds to the first parameter "date." This relationship between format specifier and parameter results in the parameter "date" being printed in the location "%s" and may be in the form of a string such as Feb. 22, 1990. The second format specifier "%d," in a similar manner, corresponds to the second parameter "population." And because of this relationship, the parameter "population" is printed in that location "%d" and may be in the form of an integer (such as 5,000,000,000). Therefore, the actual message printed on a display may be, for example: "On Feb. 22, 1990 the population was 5,000,000,000".

Parameters also may be in the form of words, real numbers, etc. Depending upon the actual message to be printed, there may or may not be parameters included, which in turn means that there may or may not be any format specifiers.

Print statements such as the one in FIG. 1 are fine as long as they are associated with the English language. However, problems are encountered when the messages must be printed in languages other than English. A first method for printing such non-English messages would be to replace the messages in the main program with equivalent, translated messages. The problem with this method, however, is that there would have to be a separate main program for each of the languages since the different language structures would require different print statements. Considering that such programs may be as much as a hundred thousand lines in length, this method is not a practical solution.

Another approach, which is somewhat more efficient, involves creating a separate, language-dependent file containing the messages for each language. This will allow the language-independent main program to be used without the need of being altered regardless of the language in which the message will be printed. In this approach, a language-independent print statement is used in the main program instead of one like that illustrated in FIG. 1. The type of print statement that should be used is shown in FIG. 2. A portion of the language-dependent file (English) associated with this type of print statement is shown in FIG. 3.

Each message to be printed by the main program is represented by a variable having a unique name. For example, in the print statement shown in FIG. 2, the variable representing the message shown in FIG. 1 is "pop_message". Each variable in turn is defined for all of the languages in which the message is to be printed (i.e., in language-dependent files). That is, the variable "pop_message" is defined in English in a file for the English language, as well as in other applicable languages in a file for each of those languages (not shown). Each of these language-dependent files also contains a definition of all of the other variables representing the various messages in the main program (also not shown). Hence, the main program will remain unchanged, while the definition of the variables will depend on the particular language in which the messages are to be printed.

The format specifiers in a language-dependent file have to appear in the same order as their corresponding parameters in the print statement of the main program. For example, in the print statement in FIG. 2, the date will appear first (as a string) and the population will appear second (as an integer). This will ensure that the parameter values will be printed in the proper form and in the proper location without changing the print statement.

As a result, the first parameter in the print statement (i.e., the date) will always be printed before the second parameter in the print statement (i.e., the population), regardless of the particular language involved. As an example, there is no problem using the print statements in FIGS. 1 and 2 in the English language because these print statements are constructed for this language. However, when it is necessary to translate the message into a different language, the same message may read awkwardly if the date is forced to appear first and the population second. And perhaps, a particular message may not be able to be translated into a specific language since it may be incomprehensible if the parameter values are forced to appear inflexibly in a special order.

By way of example, in the German language, verbs often appear towards the end of a sentence. If, however, a verb was the first parameter of a print statement (e.g., to make the sentence clearer when printed in the English language), a translation of the sentence into the German language may not be possible, but even if possible, may result in a very awkward German sentence.

There is a need to find a system and method that permits movement of parameters to suit a particular language without the need to change the main program.

SUMMARY OF THE INVENTION

The present invention provides a system and method for controlling the printing of a message that includes a number of text strings and a number of parameters.

In one embodiment of the present invention, the system includes means for designating the locations of the strings of text, and the locations and formats of the parameters within the message. The system also includes means for switching the locations and formats of the parameters after they have been designated.

In another embodiment of the present invention, the means for switching the locations and the formats of the parameters includes a permutation specifier.

The system of the present invention and, in particular, the permutation specifier, provides flexibility in the translation of messages into various languages. It does so by allowing messages to be translated in such a manner that the parameters may be printed in a different order than the order in which they appear in the main program. In many instances, such a reordering of parameters in a translation results in a clearer message than if the parameters were forced to appear in the same order as they appear in the main program. Indeed, in some instances, a reordering of parameters may be the only way to provide a comprehensible translation of a message.

The present invention also provides a method for controlling the printing of a message having a plurality of strings of text and a plurality of parameters disposed therein. In one embodiment of the present invention, the method includes the steps of designating the locations of the strings of text, and the locations and formats of the parameters within the message. The method also includes the step of switching the locations and formats of the parameters after they have been designated.

In another embodiment of the present invention, the locations and formats of the parameters within the message are switched through the use of a permutation specifier. The method of the present invention provides similar advantages to those mentioned above for the system of the present invention.

BRIEF DESCRIPTION OF THE INVENTION

FIG. 1 is a first representative example of a conventional print statement in a computer program.

FIG. 2 is a first example of a print statement associated with a separate language-dependent file.

FIG. 3 is a portion of a language-dependent file corresponding to the print statement in FIG. 2.

FIG. 4 is a portion of a language-dependent file associated with the print statement in FIG. 2 according to the present invention.

FIG. 5 is a second representative example of a conventional print statement in a computer program.

FIGS. 6 is a second example of a print statement associated with a separate language-dependent file.

FIG. 7 is a portion of a language-dependent file associated with the print statement in FIG. 6.

DETAILED DESCRIPTION OF THE INVENTION

Figure 8:
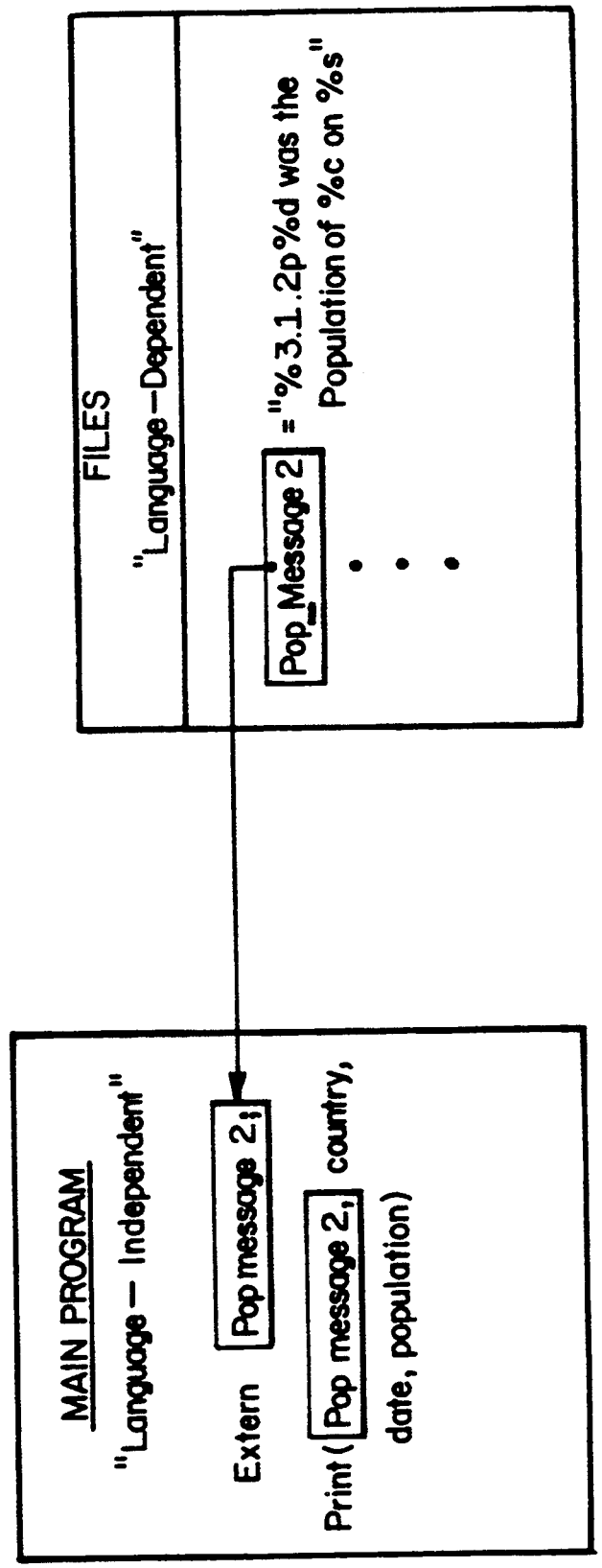
FIG. 8 is a representation of a system including a language-independent main program and a language-dependent file associated with the print statement of FIGS. 5, 6, and 7.

The present invention is a system for controlling the printing of a message having a plurality of strings of text and a plurality of parameters.

FIG. 4 provides a portion of a language-dependent file corresponding to the portion of the print statement shown in FIG. 2 that illustrates the principles of the system according to the present invention. According to FIG. 4, the message is written in a form such that the "population" is intended to appear first and the "date" is intended to appear second. This illustrates the possibility that in particular foreign languages, such a form of the message may be more grammatically correct and, therefore, easier to read. In such a situation, because the print statement in the main program in FIG. 2 still designates the "date" parameter first and the "population" parameter second (i.e., the main program has not been changed), the system according to the present invention provides a way of indicating which format specifier corresponds to which parameter. This task is performed by another format specifier, and in particular a permutation specifier, % 2.1p.

The permutation specifier begins with a "%" and ends with a "p." Between them, there are a plurality of print statement identifiers, one for each of the rest of the format specifiers in the print statement. The print statement identifiers are integers, which are assigned consecutively, starting with 1, to the parameters in the order in which they appear in the language independent print statement, such as shown in FIG. 2. The integers, which are separated by dots, appear in the permutation specifier in the order in which their corresponding parameters appear in the language-dependent print statement. In FIG. 4, for example, the first number (i.e., "2") in the permutation specifier of the language-dependent print statement of FIG. 4 indicates that the second parameter "population" in the language-independent print statement of FIG. 2 corresponds to the first format specifier (i.e., %d) of FIG. 4. The second number (i.e., "1"), which is separated from the first number by a dot, indicates that the first parameter "date" of FIG. 2 corresponds to the second format specifier (i.e., %s) of FIG. 4.

The print statement in FIG. 5 is a second example of a typical print statement that may be broken up into a language-dependent portion and a language-independent portion in accordance with the system of the present invention. As shown in FIG. 8, this is done by means of the portion of a main program shown in the language-independent print statement in FIG. 6, and a portion of the language-dependent file shown in FIG. 7.

In FIG. 7, there are three numbers between the "%" and the "p" because there are three parameters. The first number (i.e., "3") of the permutation specifier of FIG. 7 indicates that the third parameter "population" of FIG. 6 corresponds to the first format specifier (i.e., %d) of FIG. 7. The second number (i.e., "1") of the permutation specifier of FIG. 7 indicates that the first parameter "country" of FIG. 6 corresponds to the second format specifier (i.e., the first %s) of FIG. 7. The third number (i.e., "2") of the permutation specifier of FIG. 7 likewise indicates that the second parameter "date" of FIG. 6 corresponds to the third format specifier (i.e., the second %c) of FIG. 7.

The terms and expressions which are employed herein are used as terms of expression and not of limitation. And, there is no intention, in the use of such terms and expressions, of excluding the equivalents of the features shown, and described, or portions thereof, it being recognized that various modifications are possible within the scope of the invention.

I claim:

1. A system for controlling the printing of a message having a plurality of strings of text and a plurality of parameter values disposed therein, comprising:
   means for designating in a print statement the locations of the parameter values within the message;
   means for formatting a printing of the parameter values at the designated locations within the message; and
   means for reordering the parameter values within the message after the locations of the parameter values have been designated in the print statement without altering the locations of the parameter said print statement.

2. The system as recited in claim 1, wherein the means for reordering includes a permutation specifier.

3. The system as recited in claim 2, wherein the means for reordering further includes means for representing each of the parameter values.

4. The system as recited in claim 1, wherein the means for designating includes a plurality of format specifiers.

5. The system as recited in claim 1, wherein the means for formatting includes a plurality of format specifiers.

6. The system as recited in claim 1, wherein the system further comprises means for storing translations of messages in all of the languages in which the message is to be printed.

7. The system as recited in claim 6, wherein the means for storing includes a language-dependent file for each language in which the message is to be printed.

8. A system for controlling the printing of a message having a plurality of strings of text and a plurality of parameters disposed therein, comprising:
   means for assigning a value to each of the parameters;
   first means for designating the locations of the strings of text within the message;
   second means for designating in a print statement the locations of the parameters within the message;
   third means for designating the formats of the parameters within the message; and
   means for switching the locations and formats of the parameters within the message after the locations and formats of the parameters have been designated in the print statement without altering the locations and formats of the parameters in said print statement.

9. The system as recited in claim 8, wherein the means for switching includes a permutation specifier.

10. The system as recited in claim 9, wherein the means for switching further includes means for representing each of the parameters.

11. The system as recited in claim 8, wherein the second means for designating includes a plurality of format specifiers.

12. The system as recited in claim 8, wherein the third means for designating includes a plurality of format specifiers.

13. The system as recited in claim 8, wherein the system further comprises means for storing translations of messages in all of the languages in which the message is to be printed.

14. The system as recited in claim 13, wherein the means for storing includes a language-dependent file for each language in which the message is to be printed.

15. A method of controlling the printing of a message having a plurality of strings of text and a plurality of parameter values disposed therein, comprising the following steps:
   designating in a print statement the locations of the parameter values within the message;
   formatting a printing of the parameter values at the designated locations within the message; and
   reordering the parameter values within the message after the locations of the parameter values have been designated in the print statement without altering the locations of the parameter values in said print statement.

16. The method as recited in claim 15, wherein the parameter values within the message are reordered through the use of a permutation specifier.

17. The method as recited in claim 16, wherein the method further comprises the step of representing each of the parameter values.

18. The method as recited in claim 15, wherein the locations of the parameter values within the message are designated through the use of a plurality of format specifiers.

19. The method as recited in claim 15, wherein the printing of the parameter values within the message is formatted through the use of a plurality of format specifiers.

20. The method as recited in claim 15, wherein the method further comprises the step of storing translations of messages in all of the languages in which the message is to be printed.

21. The method as recited in claim 20, wherein the translations of the message are stored in a language-dependent file for each language in which the message is to be printed.

22. A method of controlling the printing of a message having a plurality of strings of text and a plurality of parameters disposed therein, comprising the following steps:
   assigning a value to each of the parameters;
   designating the locations of the strings of text within the message;
   designating in a print statement the locations of the parameters within the message;
   designating the formats of the parameters within the message; and
   switching the locations and formats of the parameters within the message after the locations and formats of the parameters have been designated in the print statement without altering the locations and formats of the parameters in said print statement.

23. The method as recited in claim 22, wherein the locations and formats of the parameters within the message are switched through the use of a permutation specifier.

24. The method as recited in claim 23, wherein the method further comprises the step of representing each of the parameter values.

25. The method as recited in claim 22, wherein the locations of the parameters within the message are designated through the use of a plurality of format specifiers.

26. The method as recited in claim 22, wherein the formats of the parameters within the message are designated through the use of a plurality of format specifiers.

27. The method as recited in claim 22, wherein the method further comprises the step of storing translations of messages in all of the languages in which the message is to be printed.

28. The method as recited in claim 27, wherein the translations of the message are stored in a language-dependent file for each language in which the message is to be printed.

* * * * *